US011578591B2

(12) United States Patent
Manders

(10) Patent No.: US 11,578,591 B2
(45) Date of Patent: Feb. 14, 2023

(54) CORRECTING FOR ECCENTRICITY OF ACOUSTIC SENSORS IN WELLS AND PIPES

(71) Applicant: DARKVISION TECHNOLOGIES INC, North Vancouver (CA)

(72) Inventor: Graham Manders, Vancouver (CA)

(73) Assignee: DARKVISION TECHNOLOGIES INC, North Vancouver (CA)

( * ) Notice: Subject to any disclaimer, the term of this patent is extended or adjusted under 35 U.S.C. 154(b) by 557 days.

(21) Appl. No.: 16/707,797

(22) Filed: Dec. 9, 2019

(65) Prior Publication Data

US 2020/0190974 A1 Jun. 18, 2020

(30) Foreign Application Priority Data

Dec. 14, 2018 (GB) .................................. 1820472

(51) Int. Cl.
*E21B 47/14* (2006.01)
*G01V 1/48* (2006.01)
*E21B 47/085* (2012.01)
*G01V 11/00* (2006.01)

(52) U.S. Cl.
CPC ............ *E21B 47/14* (2013.01); *E21B 47/085* (2020.05); *G01V 1/48* (2013.01); *G01V 11/005* (2013.01); *G01V 2210/54* (2013.01)

(58) Field of Classification Search
CPC ......... E21B 47/14; E21B 47/085; G01V 1/48; G01V 11/005; G01V 2210/54
See application file for complete search history.

(56) References Cited

U.S. PATENT DOCUMENTS

| 4,190,860 | A | * | 2/1980 | Somers | G11B 19/24 369/240 |
| 4,803,667 | A | | 2/1989 | Siegfried | |
| 5,497,202 | A | * | 3/1996 | Kim | H03L 7/08 348/536 |
| 2003/0067963 | A1 | * | 4/2003 | Miller | H04L 25/4902 375/130 |
| 2008/0170466 | A1 | | 7/2008 | Mickael | |
| 2010/0154531 | A1 | * | 6/2010 | Han | E21B 47/085 73/152.47 |
| 2017/0082767 | A1 | * | 3/2017 | Jesus | E21B 47/002 |

FOREIGN PATENT DOCUMENTS

| CN | 103114844 A | | 5/2013 |
| CN | 108571317 A | | 9/2018 |
| JP | 2001308831 A | * | 11/2001 |
| JP | 2018000339 A | * | 1/2018 |
| SU | 1041187 A1 | * | 9/1983 |
| WO | 2010019070 A1 | | 2/2010 |

OTHER PUBLICATIONS

Search Report for UK Patent Application No. GB 1820472.7, dated Jan. 24, 2019, 3 pages.

* cited by examiner

*Primary Examiner* — Natalie Huls
*Assistant Examiner* — Sharad Timilsina

(57) ABSTRACT

A device and method used to correct beamforming of an acoustic phased array in cases of eccentricity of the acoustic device in a tubular. A processor calculates the eccentricity from multiple scan lines and create a geometric model of a well or pipe relative to the device. The processor may correct each scan line's focus and/or angle of incidence at a surface of the well or pipe based on the observed eccentricity.

23 Claims, 12 Drawing Sheets

CORRECTING FOR ECCENTRICITY OF ACOUSTIC SENSORS IN WELLS AND PIPES

FIELD OF THE INVENTION

The invention relates generally to inspection of tubulars, in particular, acoustic sensors in oil and gas wells, water wells, geothermal wells, water mains or pipelines.

BACKGROUND OF THE INVENTION

In wells and fluid carrying pipes, such as oil wells and water delivery infrastructure, there often arises a need to inspect the internal structure for integrity or obstructions. For example, hydrocarbons in production casing may contaminate ground water if there are cracks or deformations in the casing. Ultrasound is a known way of imaging such structures to detect problems thus protecting the environment.

In some configurations, such as that taught in CA2989439 the ultrasound sensors are disposed radially around a collar of the device, each sensor facing generally outward towards the walls of the pipe or well. Each sensing element may be a piezoelectric transducer arranged to project most of its generated sound energy radially towards the well or pipe. This energy travels through the fluid medium and backscatters off the wall (and subsequent layers).

The transducers may be in a pitch-catch or pulse echo arrangement, in each case the image processing depends on the time for transmitted signals to be received.

Current systems are susceptible to eccentricity, i.e. whereby the longitudinal axes of the device and well are not concentric. This is most pronounced when the device is operating in horizontal pipe, where gravity tends to decentralize the device despite the use of centralizers.

This is particularly problematic with phased arrays, where several transducer elements cooperate to transmit and receive ultrasonic pulses. Timing delays are carefully calculated to create a wavefront having a set direction and focus at a particular depth on the pipe. These timing delays assume the pipe is circular in cross section and co-axial with the device (i.e. with the circular array of transducers.)

The present invention aims to address one or more of the above shortcomings by operating transducers in a novel way.

SUMMARY OF THE INVENTION

In accordance with a first aspect of the invention, there is provided a method of operating a device having an array of acoustic transducer elements distributed radially around the device. The method comprises: deploying the device into a well or pipe; capturing acoustic image comprising plural scan lines, each scan line generated by a plurality of the transducer elements; determining an eccentricity of the device in the well or pipe from time-of-flight of at least some of the scan lines; calculating phase delays to the transducer elements used to generate each scan line to correct for the eccentricity.

The phase delays may be calculated to direct the scan lines to arrive substantially perpendicular to a surface of the well or pipe, in a transverse plane of the well or pipe.

The phase delays may be calculated to correct the focus of the scan lines with respect to the well or pipe.

The acoustic images are based on time-of-flight of at least some of the scan lines. Determining eccentricity may comprise creating a geometric model of the well or pipe relative to the device, preferably fitting a circle, ellipse or spline model from the acoustic images or time-of-flight of at least some of the scan lines.

The method may write the calculated phase delays into a first memory while reading phase delays from a second memory for capturing the acoustic image frames, then further comprising switching pointers to the first and second memories at a subsequent frame for the steps of writing and reading of the phase delays.

The method may, for each scan line, select elements that are proximate a location that that scan line intercepts the array.

The method may repeat the steps of capturing frames, determining eccentricity and calculating phase delays, in real-time, while moving the device through the well or pipe.

Determining eccentricity may be performed over a plurality of frames, preferably performed over a moving average, median fit or spline fit of a plurality of recent frames.

The eccentricity may be calculated to model localized portions of the well or pipe that are deformed and wherein phase delays are calculated to correct beamforming for those localized portions based on the model.

The phase delays may synthesize the scan lines as appearing to originate from a centre of the model of the well or pipe.

The method may adjust start of a receiving window for each scan line based on an eccentric distance from the plurality of the transducer elements in that scan line to the well or pipe.

In accordance with a second aspect of the invention, there is provided a device comprising: an elongate body deployable into a well or pipe; an array of acoustic transducer elements connected to and distributed radially with respect to the elongate body; a memory storing phase delays for beamforming scan lines from a plurality of transducer elements; a circuit to transmit and capture the scan lines using the phase delays and a processor. The processor is arranged to: calculate eccentricity of the device in the well or pipe from time-of-flight of the plural scan lines; calculate new phase delays for the transducer elements used to generate each scan line to correct for the eccentricity; and load the new phase delays into the memory.

The device may comprise a multiplexer for selecting a set of transducer elements from the array to create a scan line and wherein the processor is arranged to select the set elements for each scan line to correct for the eccentricity.

The memory may be logically or physically divisible into a first memory portion accessed by the circuit for beamforming and a second memory portion accessed by the processor for writing the new phase delays.

The circuit or processor may be arranged to switch pointers to the first and second memory portions for writing and reading of the phase delays.

The correction to the beamforming enables the device to operate with some off-center positioning. The resulting pulses are much crisper than previous systems.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

Figure 1:
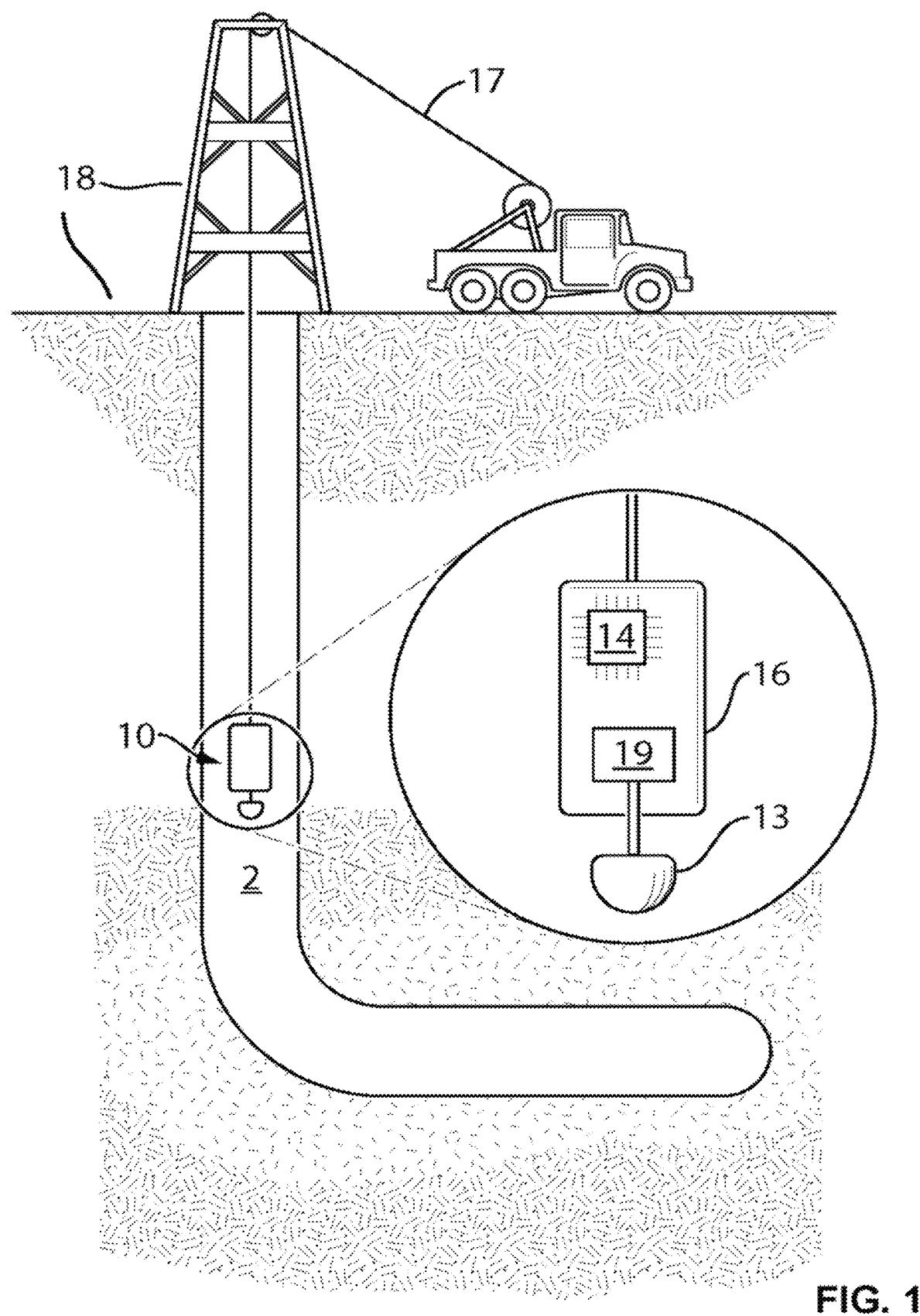
FIG. 1 is a cross-sectional view of an imaging device deployed in a wellbore in accordance with one embodiment of the invention.

Similar reference numerals indicate similar components having the following key:
2 tubulars, such as a well, pipe, borehole, tubing, or casing;
10 imaging device;
11 scan line;
12 acoustic array;
13 transducer element;
14 imaging/control circuit
15 acoustic aperture;
16 body;
17 wireline;
18 operations site;
20 centralizers;
21 tool center;
22 transmission center;
24 ellipse fit;
25 spline fit;
26 focal distance;
27 inner radius to capture;
28 outer radius to capture;
29 internal void;
30 inner pipe surface;
31 outer pipe surface;
80 Analogue Front End;
81 HV Pulser;
82 HV Mux/Demux;
83 HV Protection switch;
84 FPGA;
85 ADC;
86 Amplifiers (including DVGA, LNA, and Summing Amps);
87 Image processor;
88 Rx beamforming; and
89 Tx beamforming.

DETAILED DESCRIPTION OF THE INVENTION

With reference to the figures, devices and methods are disclosed for correcting beamforming during imaging a fluid-carrying conduit by an acoustic transducer array. This conduit may be a well/pipe for carrying hydrocarbons or water and will generally have an elongate form factor through which the device can move longitudinally. The device typically also has an elongate form factor and is sized to be deployable within the well or pipe. Wells include cased and uncased wells, at any stage from during drilling to completion to production to abandonment.

Figure 3:
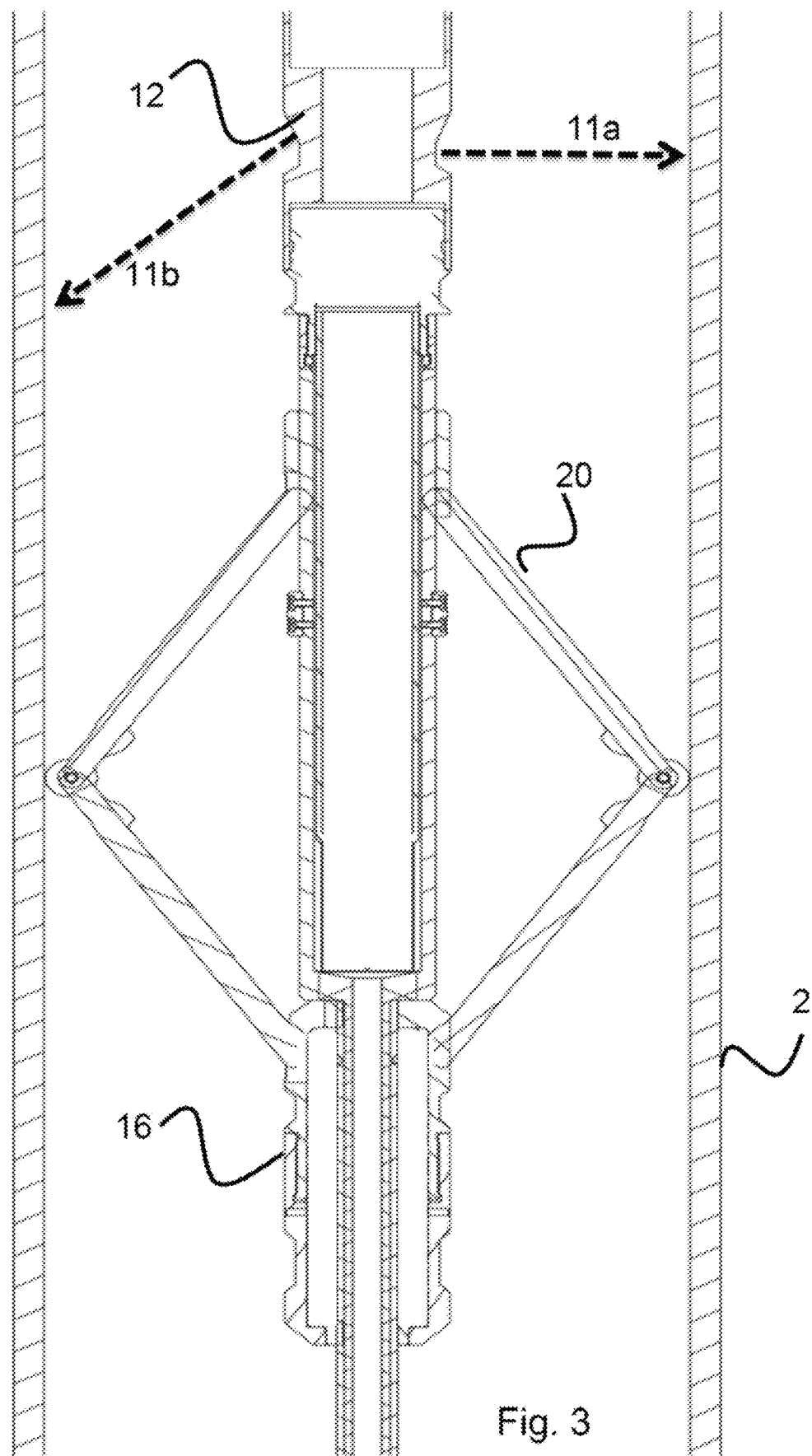
FIG. 3 is a cross-sectional view of an imaging device in a well.

In accordance with one embodiment of the invention, there is provided an imaging device 10 for imaging a wellbore 2, as illustrated in FIGS. 1 and 3. The imaging device 10 generally comprises an acoustic transducer array 12, a body 16, an imaging circuit 14, optional actuators 19, and one or more centralizing elements 20. Acoustic transducers are desirable in fluid well inspection applications because they can work even in opaque fluids, can be beam steered to change the apparent direction of a wave-front, and can be beam focused to inspect different depths. Thus, the imaging device can acquire volumetric data of the well. The volumetric data can include surface features of cases/liners/tubulars, defects in cases/liners/tubulars, and structure of rock formations beyond the tubular.

The device may be that described in patent applications WO2016/201583A1 published 22 Dec. 2016 to Darkvision Technologies Ltd, incorporated herein in its entirety. Described therein is a device having an array of radially-distributed, outward-facing acoustic transducers (i.e. a radial array). The array 12 sonifies the well or pipe with acoustic pulses emitted radially 11a or conically 11b (see FIG. 3).

Transducers

Figure 2A:
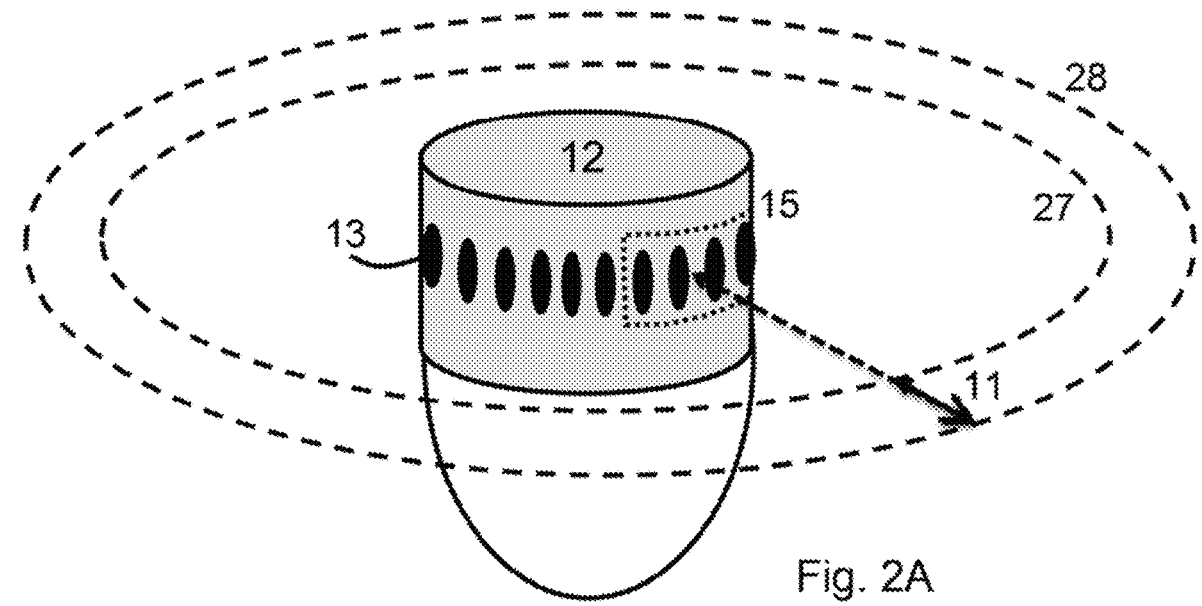
FIG. 2A is a perspective-view of a radially acoustic array and a field of view.
Figure 2B:
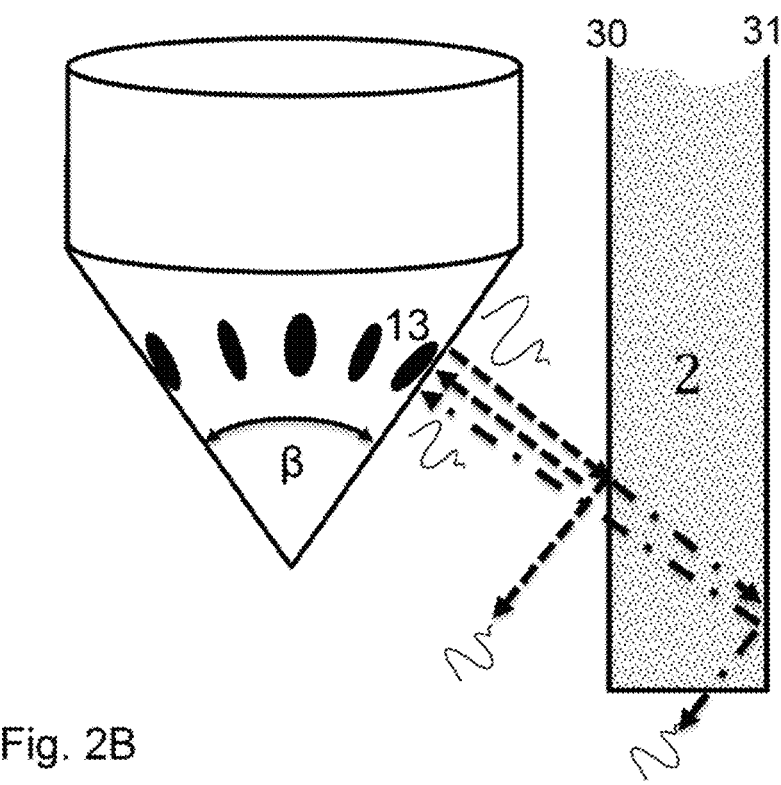
FIG. 2B is a perspective-view of a radial acoustic array in a conical arrangement.

The array comprises a plurality of acoustic transducer elements, preferably operating in the ultrasound band, preferably arranged as an evenly spaced one-dimensional radial array (see FIGS. 2A, 2B). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features.

The number of individual elements in the transducer array affects the resolution of the generated images. Typically, each transducer array is made up of 32 to 2048 elements and preferably 128 to 1024 elements. The use of a relatively large number of elements generates a fine resolution image of the well. The transducers may be piezoelectric, such as the ceramic material, PZT (lead zirconate titanate). Such transducers and their operation are well known and commonly available. Circuits 14 to drive and capture these arrays are also commonly available.

The transducers may be distributed radially, equidistant around the body of the device. As seen in FIG. 2A, the transducers 13 may be substantially outward, radially-facing. When the device is situated longitudinally in the well/pipe, this arrangement is useful for measuring wall thickness. In this 'caliper arrangement', a first reflection is received from the inner wall 30 and then a second reflection is received from the outer wall 31. However, there may be multiple reflections as the wave bounces between walls. This transducer arrangement captures a ring-shaped cross-sectional slice of the well covering 360° around the array 12 and is useful for thickness measurements. As the device is moved axially in the well or pipe, in either direction, the ring-shaped transducer continually captures slices of the well that are perpendicular to the longitudinal axis of the well and logs a 3D image of the well.

Figure 8:
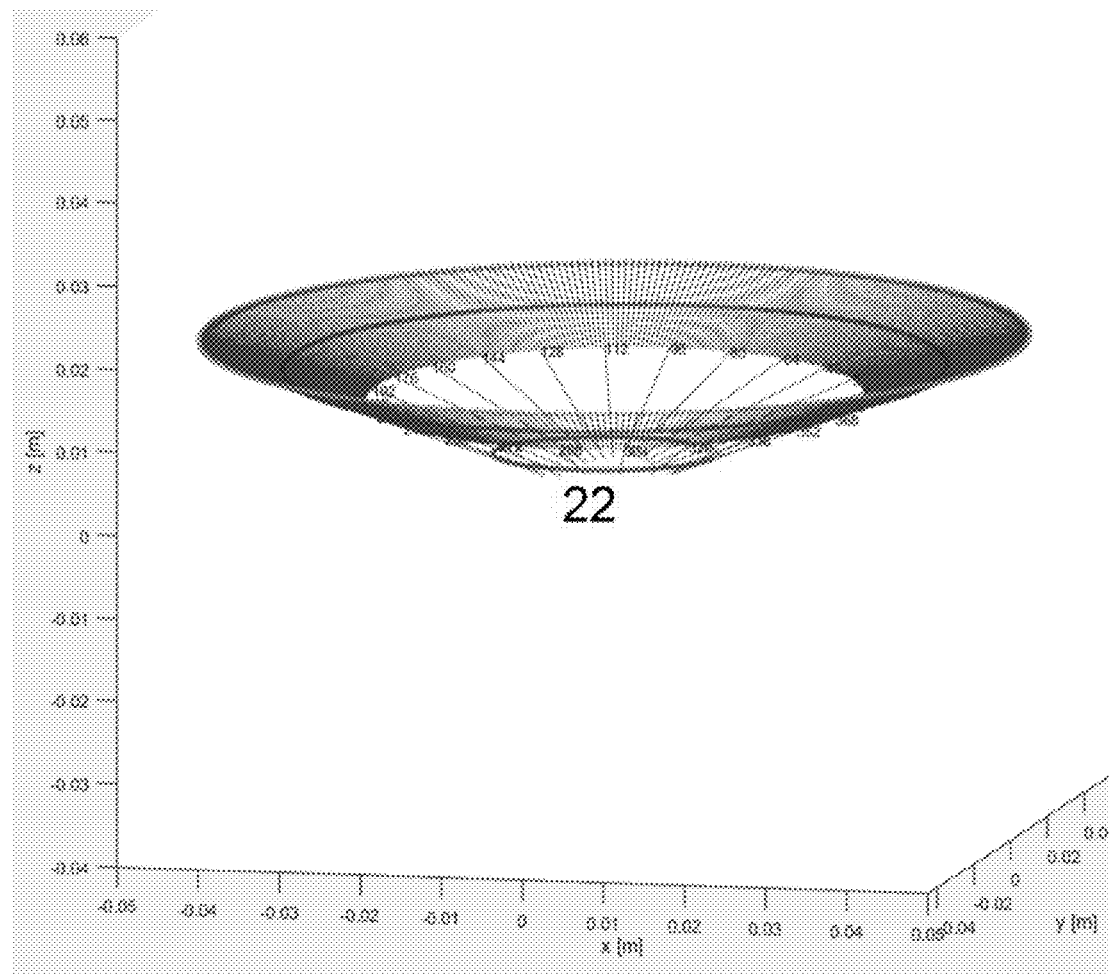
FIG. 8 is an illustration of scan lines from a conical array.

In the alternative arrangement of FIG. 2B, the transducers are distributed on a frustoconical surface with transducers facing partially in the longitudinal direction of the device, (and thus in the longitudinal direction when in the well). Thus, the radial transducers are angled uphole or downhole to form an oblique-shaped conical field of view. The cone may have a cone angle β of 10-45°, preferably about 20°. In this arrangement, much of the sound wave reflects further downward, but a small portion backscatters off imperfection on the surfaces or voids within the wall back towards the transducer. FIG. 2B shows acoustic pulses (moving in the direction of the dashed lines) transmitted towards inner wall 30, most of which bounces downward and some backwards to the transducer 13. Some of the wave energy (dot-dashed lines) propagates to the outer wall 31, then bounces downward and partially back to the transducer. FIG. 8 illustrates all scan lines in a frame projecting radiating outwards and partially axially (Z axis), as a cone (called the imaging cone), This conical design may also face uphole, i.e. towards the proximal end of the device and the operator. The array 12 may be located at an end of the device (e.g. FIGS. 2A, 2B) or between the ends (e.g. FIG. 3).

Scan Frame

An acoustic transducer element can both transmit and receive sound waves. A plurality of transducer elements cooperates as a phased-array to generate a steered and focused wavefront. The apparent origin of the wave can be synthesized within the device, referred to as a 'transmission point,' (or 'transmission center' 22 for a plurality of intersecting scan lines), by the set of transducers, called the aperture 15. The number of scan lines N that make up a full frame may be the same as the number of elements M in the array, but they are not necessarily the same. In FIG. 2A, (solid) scan line 11 appears to radiate out (dashed line) from the center of the four transducers 13 in aperture 15 (enveloped by the dotted line).

Figure 7:
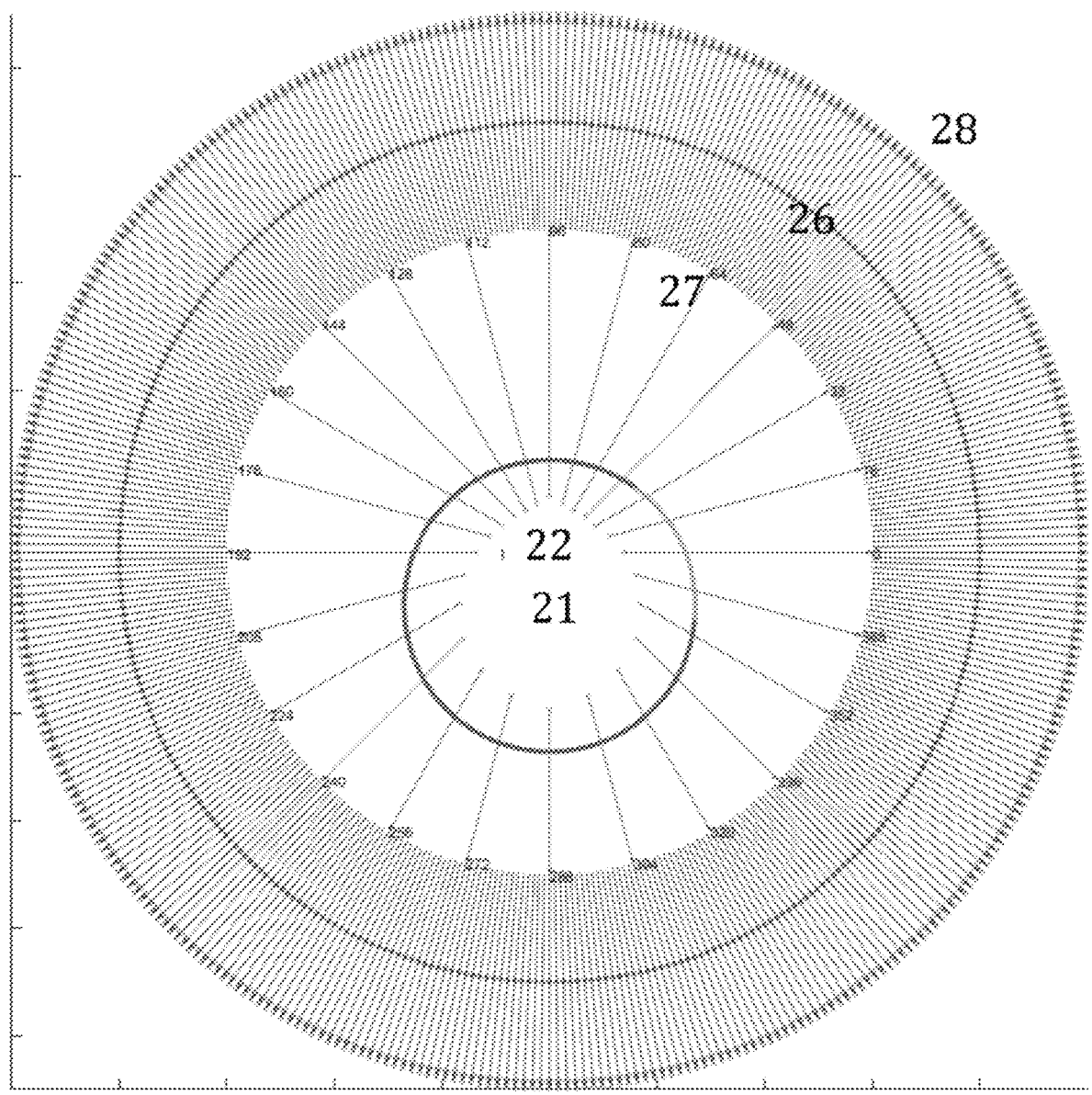
FIG. 7 is an illustration of scan lines and their transmission center.

Discreet omnidirectional pulses are emitted from the plural transducers, which waves interfere constructively and destructively to produce a wavefront moving in the direction of the scan line. As known in the art, altering the timing of the pulse at each transducer, can steer and focus the wavefront. In steering, the combined wavefront appears to move away in a direction that is not-orthogonal from the transducer face, but still in the plane of the array. In focusing, the waves all converge at a chosen distance from the elements. The location of the convergence is the focal point and the area sonified defines the resolution of the system. FIG. 7 illustrates an example device, whereby 384 scan lines focus at a diameter 26 (e.g. 12 cm), to create non-overlapping sonified areas of 1*mm* resolution.

Figure 6:
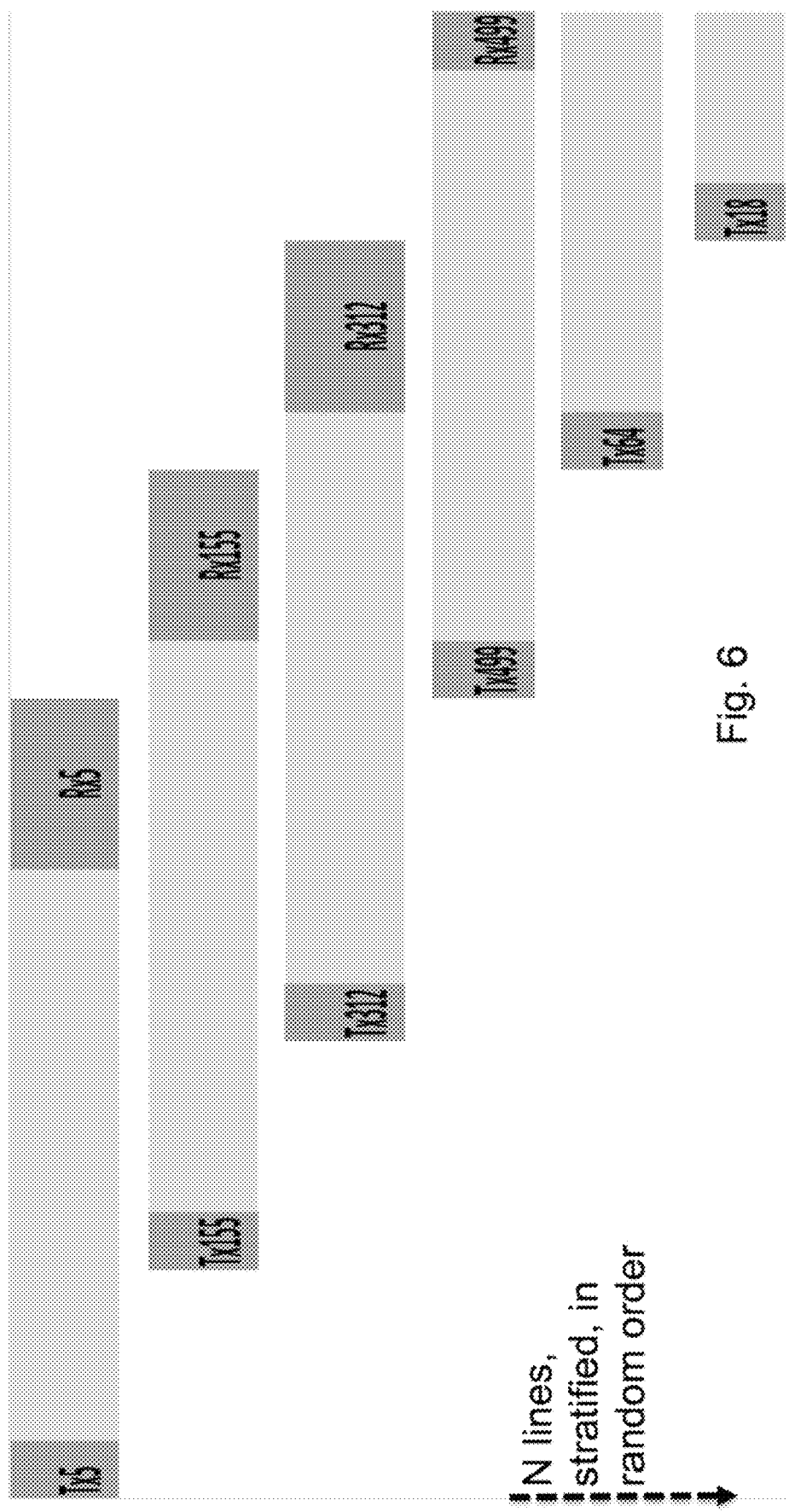
FIG. 6 is timing diagram for scheduling transducers.

The timing of each scan comprises a transmission window Tx, receiving window Rx and dwell period therebetween. As used herein, a scan line 11 is the stream of data received during Rx and may be provided in physical coordinates using the speed of sound. FIG. 6 is a timing diagram showing Tx and Rx periods for scans 5, 155, 312 and 64. During transmission, the transducers are excited with an electrical pulser 81, which pulse may be square, sinusoidal or other regular waveform. At the end of Tx there is a dwell period while the wave travel outs and back to the transducer element or aperture. During the Rx window, the circuit 'listens' to reflections at the transducer element or aperture. There may be multiple reflections along paths of various lengths, so the Rx window is much wider than the Tx window.

By way of example, the transmission step may include selecting the elements in the aperture, calculating beamforming timings, loading the pulse timings from the FPGA 84, activating the pulser 81 and MUXes 82 to pulse all elements. The dwell period may be set by the operator based on the expected diameter of the pipe and speed of sound in the well fluid. The Rx window may be set to capture the first reflected pulse from the inner radius of interest (27) until the last element has received the last pulse that could reflect off the outer radius of interest 28 (See FIGS. 2A and 7). The scan line's capture radii 27/28 will normally be wider than the actual wall thickness 30/31.

The dwell and Rx window may be automatically adjusted by the processor to account for the true well diameter, eccentricity, local speed of sound, and last reflected, usable pulse. The scheduler cycles through all N lines in a frame.

Improved Scheduling

As taught in GB1816867.4 filed 16 Oct. 2018, incorporated herein in its entirety, scheduling may be overlapped to increase the frame rate. An improvement is to schedule the Tx for each line to complete before the Rx window of the previous line starts. This reduces each sensor period by Rx+Tx, reducing the total frame period by 22 ms in the example above.

Indeed, in preferred embodiments of the present invention, the frame period can be vastly reduced by transmitting multiple pulses (Tx1, Tx2, Tx3, etc.) before the first Rx window, i.e. within the first dwell period. As shown in FIG. 6, three transmissions are sent before the first receive window is started for listening. This pattern is repeated, with two transmissions sent in the dwell period of each previous line scan. Note that there are still no Tx or Rx windows overlapping. In FIG. 6, there is enough time in the first dwell period to schedule additional Tx but then some windows will overlap and/or the pattern will become unsustainable.

As taught in GB1816867.4, the scheduler selects one scan line from each stratum in a structured approach, random approach, or with correlated sampling.

Circuit

Figure 9:
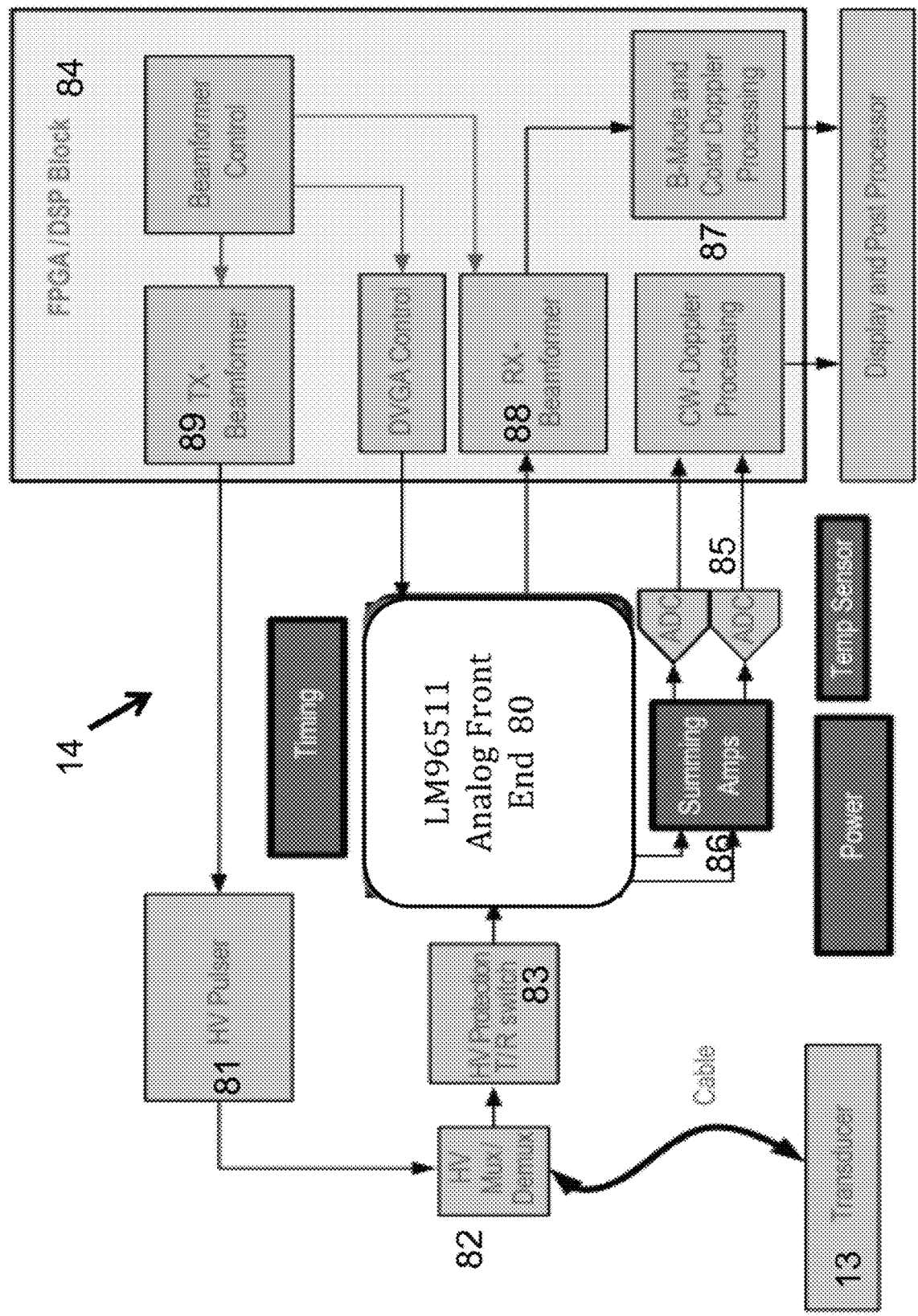
FIG. 9 is a circuit block diagram for ultrasound transducers.

The device comprises a processing circuit for generating and receiving signals from the transducers. The skilled person will appreciate that the circuit may implement logic in various combinations of software, firmware, and hardware that store instructions process data and carry out the instructions. Specialized Ultrasound circuits exist to drive and receive arrays of ultrasound transducers, such as LM96511 from Texas Instruments. FIG. 9 reproduced from the corresponding Data Manual (www.ti.com/lit/ds/snas476h/snas476h.pdf accessed 1 Aug. 2018) provides an example circuit comprising a computer processor (for display and post processing), FPGA block 84, Summing Amps 86, ADC 85, MUX/DEMUX 82, High Voltage T/R switch 83, High Voltage Pulser 81, and timing chips. The FPGA is an efficient chip for integrating many logical operations. The block may comprise Tx beamforming 89 and Rx beamforming 88, DVGA control (Digitally controlled Variable Gain Amplifiers), as well as data processing operations 87, such as B-mode (brightness mode) and Doppler processing. Although not shown, the circuit may additionally comprise motor drivers and memory chips.

Without loss of generality, each of these components may comprise multiples of such chips, e.g. the memory may be multiple memory chips. For the sake of computing efficiency, several of the functions and operations described separately above may actually by combined and integrated within a chip. Conversely certain functions described above may be provided by multiple chips, operating in parallel. For example, the LM96511 chip operates eight transducers, so four LM96511 chips are used to operate an aperture of 32 transducers.

The computer processor accesses instructions stored in the memory. The instructions may control the operation of the device, its actuators, and high-level scanning steps, while the actual timing of transducers may be left to FPGA 84. The FPGA memory may store a plurality of beamforming parameters, such as the sequence of lines, transducer addresses comprised in a given line, and the phase delays of the transducers in the aperture. In preferred embodiments, there are two such memories that alternate in purpose, one memory storing the presently used values and a second memory being written with newly calculated values. This allows the device to correct eccentricity in real-time and log continuously, without pausing to load new values which otherwise would corrupt a scan midway through. The processor may comprise circuitry or instructions to change the memory pointer for reading and writing of beamforming parameters, from which the next scan line is to be created, preferably timed for the beginning of a new frame.

The FPGA generates a set of timing signals as well as selection signals to control the MUX. The pulser receives the timing signals and generate one or more pulses of electrical energy to vibrate the piezoelectrical crystals at the drive frequency. The MUX selects the desired set of transducers in the scan line to receive the timed pulses. The HV switch 83 prevents the high voltage pulses from reaching the analog front end 80.

During the Receive window, the switch 83 connects the analog chip 80 to the same transducers selected by the MUX. The signals may be sampled at a higher frequency than the pulse frequency, preferably at least twice the pulse frequency. The same delay timings are applied to the received signals to offset the signals and sum them using the Summing Amp 86. ADC 85 converts the summed signal to the digital domain, which data is processed in B-mode or Doppler mode.

Centralizing

The imaging device 10 may include one or more centralizing elements for keeping the imaging device in the center of the wellbore. FIG. 3 illustrates a device comprising a centralizing element 20, wherein the centralizing arms extend outwardly and abut the inner wall of the well casing or pipe 2 to keep the device in the center of the well or pipe. They may be two centralizers, one before and one after the array to be centered.

The device is ideally concentric with the conduit, i.e. the longitudinal axis of the imaging device is perfectly aligned with the longitudinal axis of the well or pipe. Therefore scan lines radiate perpendicular out from the array, arrive perfectly focused and perpendicular to the tubular's surface, and reflect back to the same transducers. The times of flight for every transmission to the well or pipe are substantially the same for a circular tubular, with small variations due to surface imperfections. Ideally, the receiving window Rx may be tightly framed around the inner and outer surfaces of the pipe, i.e. the time for recording reflections is timed to start just before the expected inner reflections and stop just after the outer reflections.

However in reality, the device tends to be off-center of the well (i.e. the longitudinal axes are parallel but not aligned), a condition called eccentricity. This may be because the centralizers 20 are not working correctly, or the weight of the device pulls the device below the longitudinal axis of the pipe in horizontal orientations, such as the lower part of well 2 shown in FIG. 1. Also, the pipe itself may be non-circular (e.g. deformed) due to stresses applied to it.

For example, the Rx window to detect reflections in a 1 cm thick steel casing would minimally be 0.01 m/5790 m/s=1.7 μs. If the device were 2 cm off-axis, the Rx window in the uncompensated case would be widened for both the closest and furthest points, making the window an addition 4 cm/1590=25 μs. This is a large relative change and will comprise largely empty data.

Eccentricity Correction

In the present system, the eccentricity, specifically the cross-sectional eccentricity, is determined, and beamforming adjustments are calculated to regain the above advantages, such as perpendicular incidence, better focus and tighter Rx windows. The calculations are made with respect to the geometric model of the pipe, as the actual pipe geometry is not known a priori.

Figure 4:
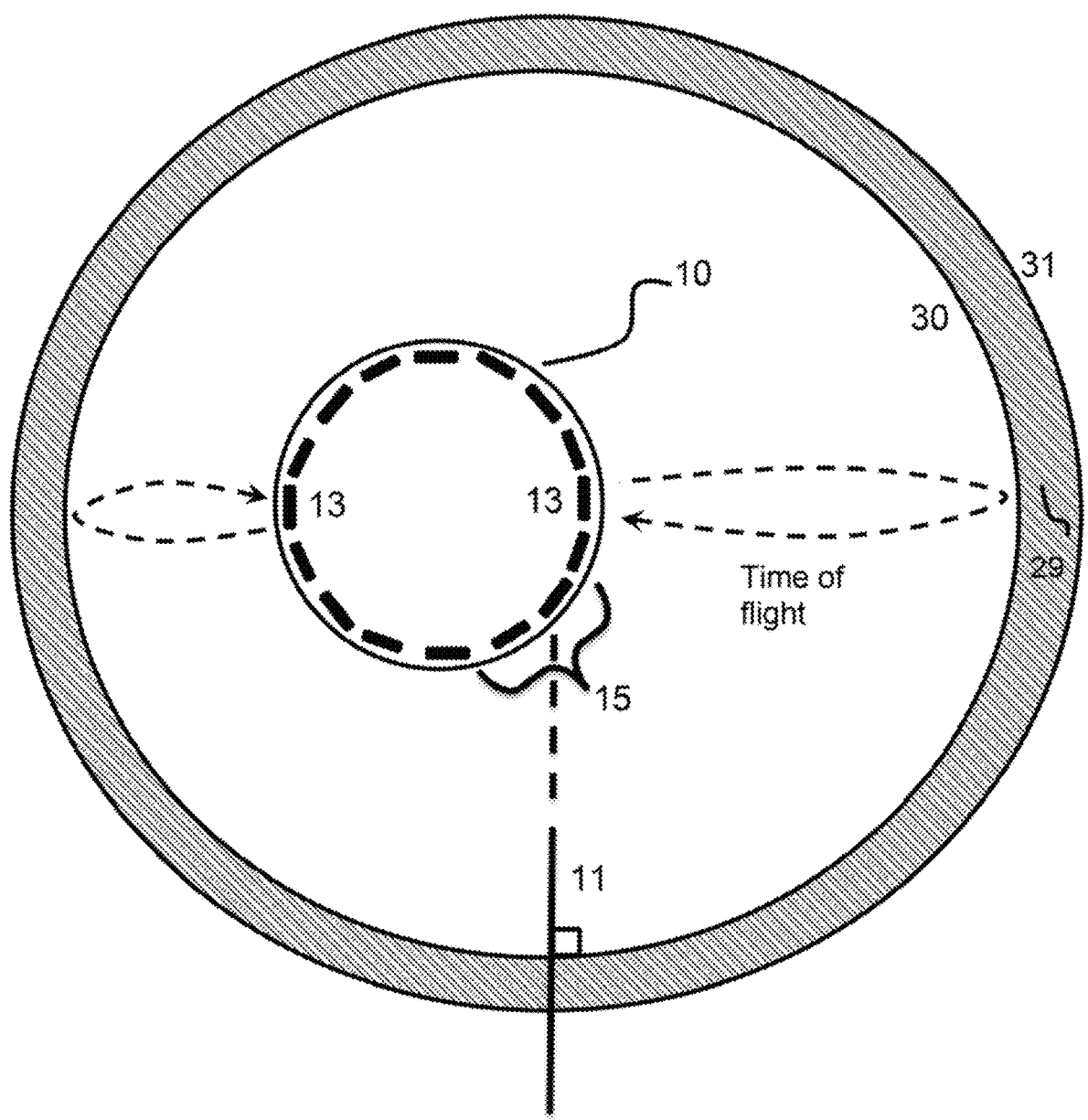
FIG. 4 is a plan view of a device in a well.

The circuit stores delay timings for each element in the aperture, which timings may be initialized based on an expected pipe diameter and assumption of perfect centralization (no eccentricity). Multiple scan lines are transmitted, and the times of flight are recorded, which corresponds to the pulse-echo time. In FIG. 4 there are different times of flight for two elements 13, which are convertible to distances by the speed of sound in the fluid to determine lateral eccentricity. With additional scan lines at different positions, two-dimensional eccentricity can be determined.

Figure 5:
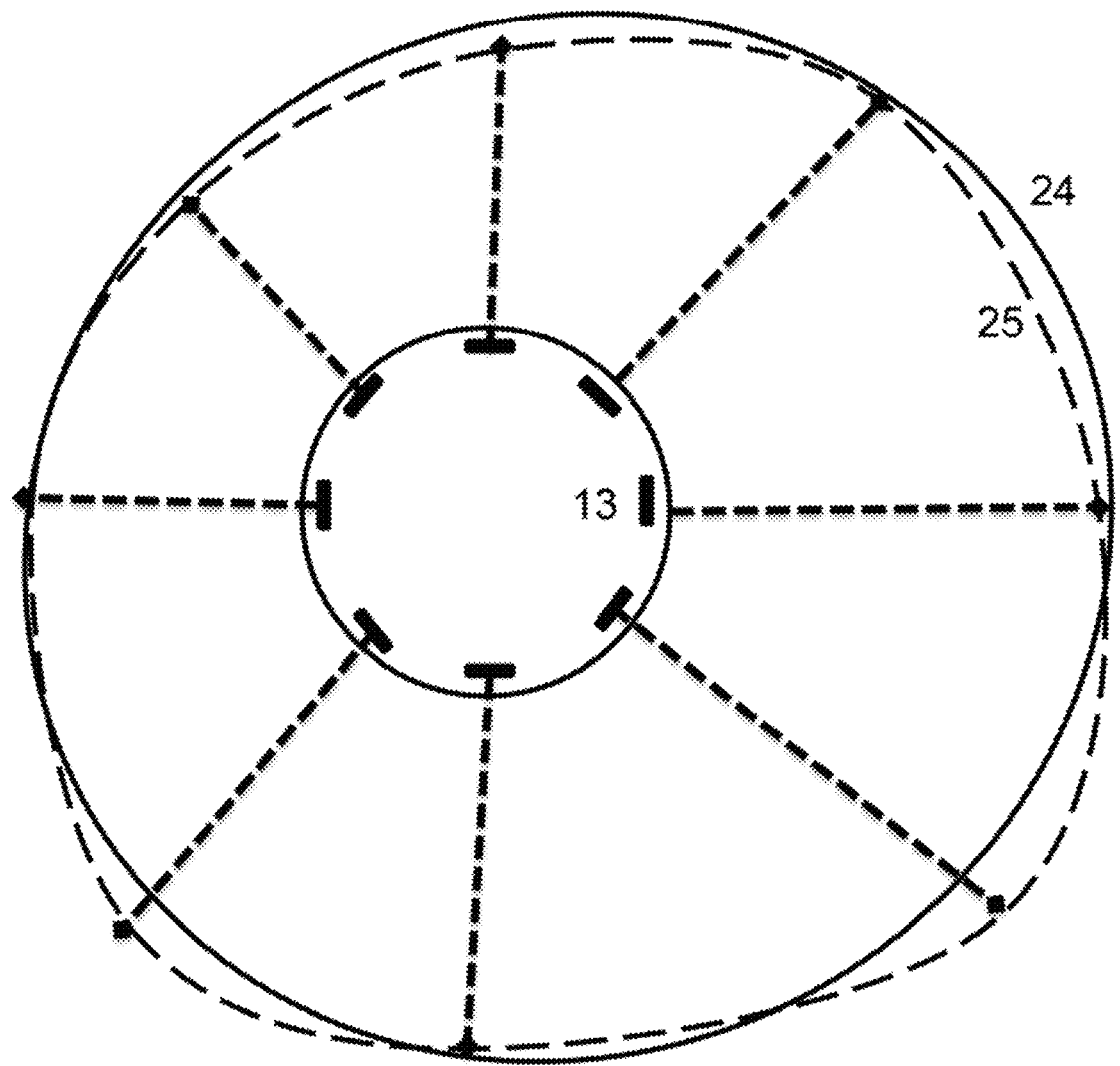
FIG. 5 is an illustration of shapes fitted to reflected points.

FIG. 5 illustrates a set of distances (spots) measured from the device based on the times of flight. Due to signal noise and artefacts in the well, one cannot assume these represent the actual shape and location of the pipe—indeed there may appear to be sharp discontinuities that physically should not exist.

Thus the processor preferably fits a shape or spline to the pipe. In FIG. 5, solid line 24 represent a best fitting ellipse based on least squares errors. Dashed line 25 is a spline fit. Other shapes and fitting algorithms are known and envisaged. For example the Random Sample Consensus (RANSAC) algorithm is a known iterative method to estimate parameters of a shape model, such as a circle, from a set of observed data that contains noise and outliers.

Figure 10:
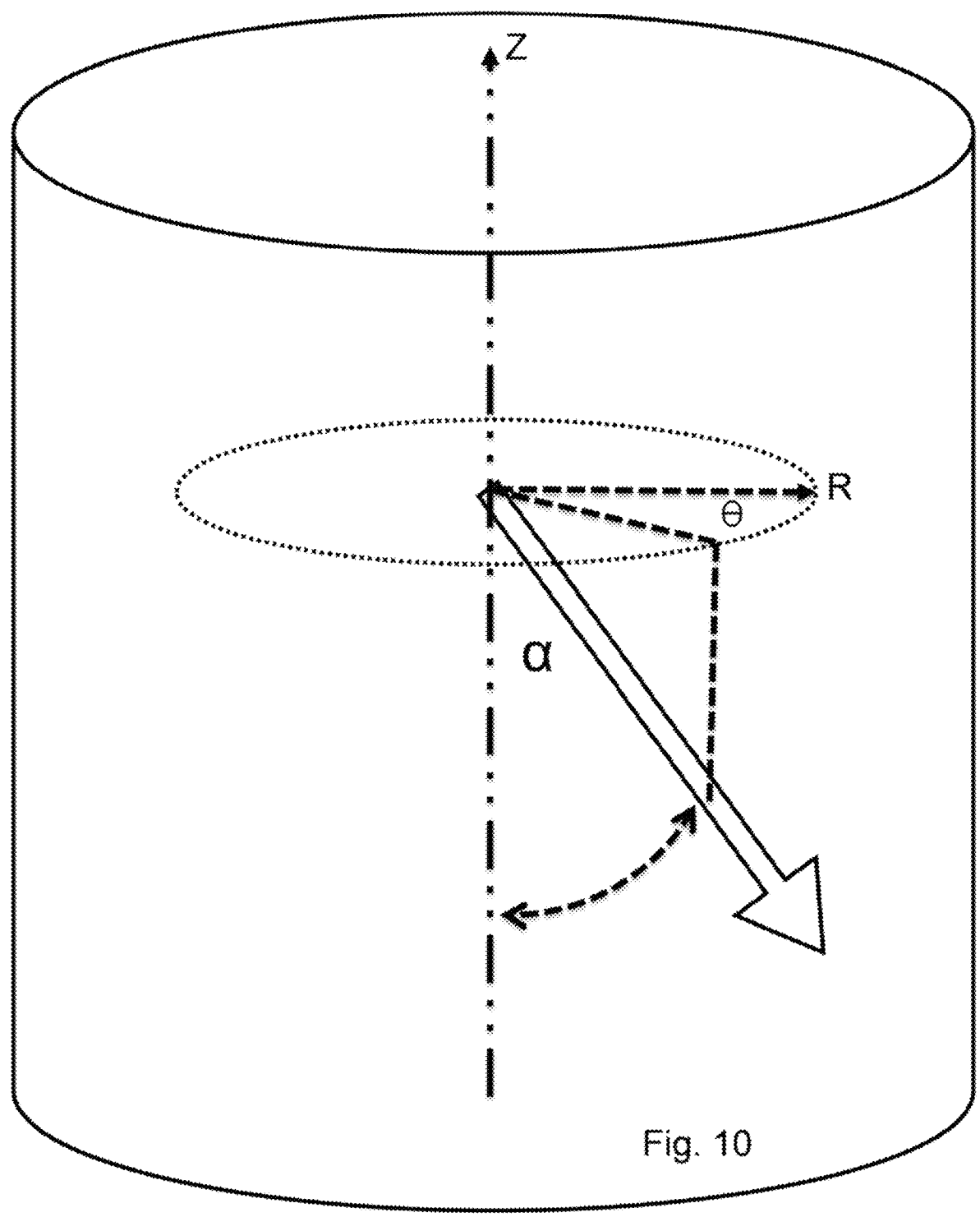
FIG. 10 is an illustration of a cylindrical coordinate system.

In some embodiments, the processor determines the current eccentricity from the acoustic images, preferably by averaging over several frames. Eccentricity calculations may be performed periodically (e.g. every X frames), or performed on a moving average, median fit or spline fit of the last Y frames. Depending on the eccentricity shape fitting used, the resulting representation will have one (circle), two (ellipse) or multiple (spline) central points, recorded as transverse offsets from the center 21 of the radial sensor array or of the device. The offsets may be in cartesian coordinates (x, y) or polar coordinates (Z, R, θ as shown in FIG. 10). These focal points indicate where plural scan lines reflected perpendicular from the pipe surface would meet.

Figure 11:
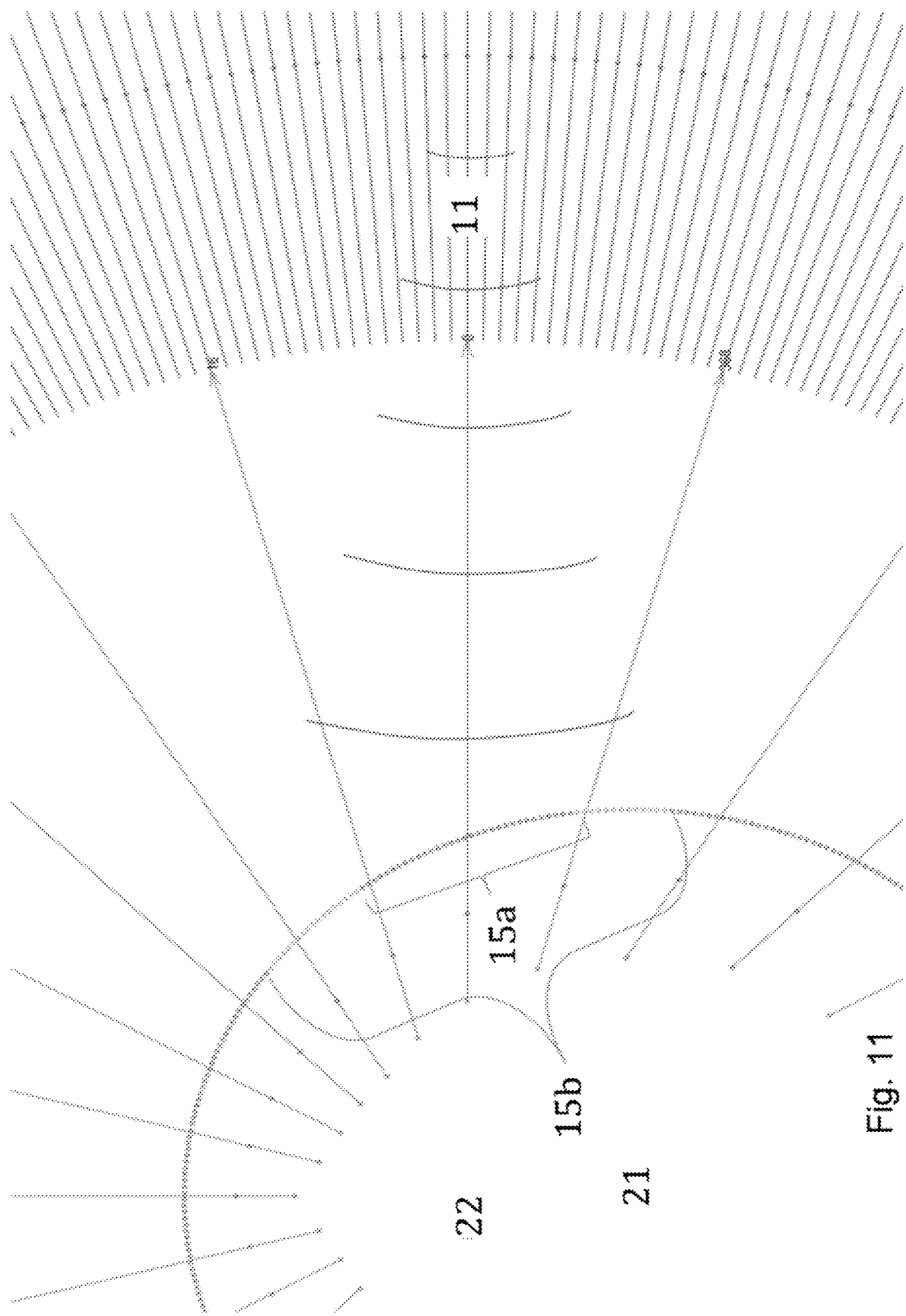
FIG. 11 is an illustration of different centers and aperture selections.
Figure 12:
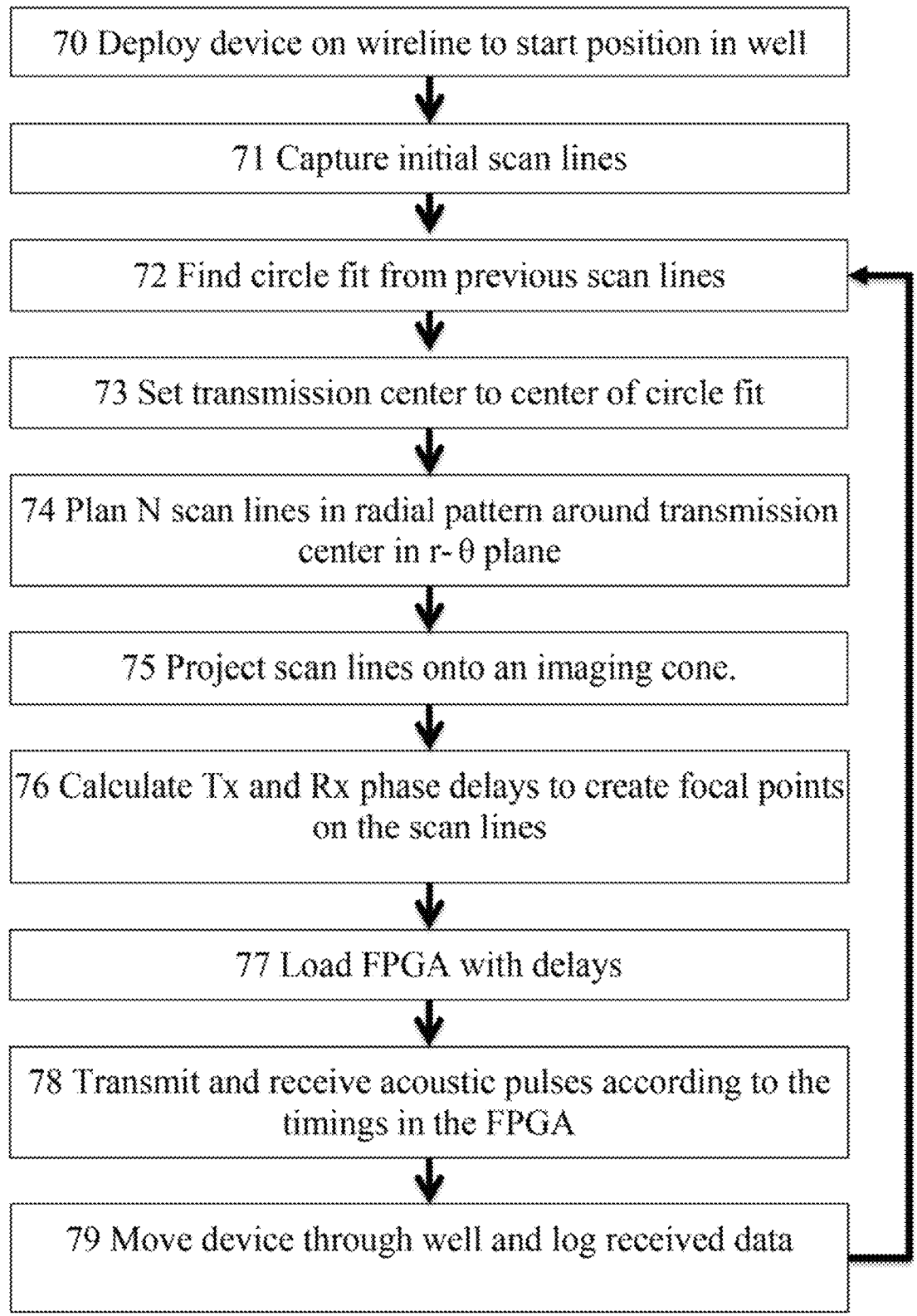
FIG. 12 is a workflow for correcting for eccentricity.

These central point(s) may then be treated as the transmission point(s) 22 from which scan lines would appear to originate after the beamforming adjustment. The transmission center 22 should be within the envelope of the radial transducer array to ensure all scan lines can be generated optimally. Otherwise certain scan lines will not arrive perpendicular to the pipe surface. FIG. 11 illustrates scan lines 11 generated by transmission aperture 15a and received by receiving aperture 15b, which lines converge at point 22, which is within the array but offset from the device center 21.

In known systems, different but static timings are provided to the elements, whereby outer elements are pulsed before inner elements and the outer elements are pulsed symmetrically, i.e. elements equal distance from the center of the scan line are pulsed at the same time. Thus the coherent wavefront will be move perpendicularly away from the array surface. By pulsing the outer elements even earlier, the wavefront narrows to a focal distance 26 on the pipe.

In the present system, for eccentric conditions, the timings are not symmetric about the center of the aperture. The scan line does not leave perpendicular from the array. Instead the processor calculates timing delays for the aperture of each scan line, such that the scan lines arrive substantially perpendicular to the modelled surface of the pipe. That is the wavefront arrives parallel to the surface and reflects back towards the array.

Focus

In prior systems, the beamed may be focused to converge at the inner surface of the pipe. The device may easily be off-center by an amount equal to the pipe wall thickness, such that the beam actually focusses at the outer surface of the near wall or in the fluid before the inner surface of the far wall.

In the present system, the focus of each wave, determined by phase delays within the aperture, is calculated in real-time to correct for the change in distance due to eccentricity. The processor calculates the distance to the modelled pipe from the centre of each aperture. Thus even those scan lines emitted perpendicular to the array will be affected by eccentricity, in order to correct the focal distance and set the start of the Rx window.

The phase-delays used to create the transmission pulse may be re-used during receiving to shift and sum signals by summing amplifier 86. This re-use simplifies processing especially for real-time, on-chip signal processing.

However, this approach assumes that the modelled pipe is the same as the real pipe that causes the reflections. In preferred embodiments, the shifting is done to optimize coherent summation, selecting shifting values where the combined signal is maximum. The processor may use the Tx delays as a starting point, and hunt about those delays to find the optimal Rx delays.

The receiving and transmit apertures may be a different size depending on the circumstance. For example, for attenuating fluids it is advantageous to use a larger number of transmit elements to ensure maximum energy transfer while reducing the number of receive elements to minimize the strength of the side lobes.

The focal point calculations can also be used to correct the Rx window to start at the modelled distance (and thus time) to the sonified spot from the array. This is a change to the dwell time and thus also to the scheduling of lines. The Tx windows will increase for extreme beam steering cases, but this is small compared to the other timings. For example, a regular interlacing scheduling pattern will be interrupted in cases where the longer (or shorter) dwell time and displaced Rx window would now cause any Rx and Tx widows to overlap.

Aperture

As discussed above, the aperture 15 is a set of neighboring transducer elements that individually contribute towards the constructive wavefront and increase its acoustic energy. There may, for example, be 32 or 64 elements in the aperture that are selected from the whole array by multiplexors. Normally these are a symmetrical set of elements opposite the pipe spot to be sonified, i.e. the spot and aperture centre have the same azimuthal angle θ.

However, as the tool becomes eccentric some of the elements do not have line-of-sight to the sonified spot, being blocked by the device body. In FIG. 4, scan line 11 is normal to the wall but the aperture 15 is not symmetric about this normal line. Here, the selection of elements is rotated two elements from those that would be selected when the device is centered. Conversely the aperture in the horizontal scan lines in FIG. 4 are unaltered.

One selection scheme is to project the scan line perpendicular from the well or pipe thru the radial array to determine an intercept location. Then a set of elements proximate the intercept location are selected for the aperture. For example, the aperture may be the closest 16 elements on either side of this location.

Deployment System

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs.

Although the present invention has been described and illustrated with respect to preferred embodiments and preferred uses thereof, it is not to be so limited since modifications and changes can be made therein which are within the full, intended scope of the invention as understood by those skilled in the art.

Computer Program Listings

Processing for determining and correcting for eccentricity may be performed in software or firmware. A software implementation in C++ is provided below to aid in understanding the logic and correction algorithms described above. The skilled person will appreciate that the code provided is part of a larger program that would be written or imported to run properly.

```
void ImagingController::eccentricBeamforming( ) {
    calculateScanLineCoordinates( );       // Plan the scan lines
    findActiveElements( );                 // Find the active elements in the aperture
    calculateTxDelays( );                  // Calculate the Tx delays
    calculateRxDelays( );                  // Calculate the Rx delays
}
void ImagingController::calculateScanLineCoordinates( ) {
    const doubleVector3 TranmissionCentre(m_params.m_TransmissionCentre[0],
m_params.m_TransmissionCentre[1], m_params.m_TransmissionCentre[2]);
    auto& lines = m_lineSequence;
    uint32_t numLines = uint32_t(m_params.m_imageHeight);
    lines.resize(numLines);
    const doubleVector3 unitX{ 1,0,0 };
    const doubleVector3 referenceLineStart = unitX * m_params.m_minRadius;
    const doubleVector3 referenceLineStop = unitX * m_params.m_maxRadius;
    const doubleVector3 referenceLineFocus = unitX * m_params.m_focus;
    double referenceLineLengthProjected = distance(referenceLineStop,
referenceLineStart) / cos(m_probe.m_coneAngle * M_PI /180.0);
    double referenceLineFocusProjected = (referenceLineFocus.x -
referenceLineStart.x) / cos(m_probe.m_coneAngle * M_PI /180.0);
    double a = ::tan((90 - m_probe.m_coneAngle) * M_PI /180.0);
    for (uint32_t lineNo = 0; lineNo < numLines; lineNo++) {
        auto& line = lines[lineNo];
        double angle = static_cast<double>(lineNo) / static_cast<double>(numLines)
```

```
* m_probe.m_fieldOfView * M_PI /180.0;
            const auto rotation = doubleMatrix3x3(rotate(angle, doubleVector3{ 0, 0,1 }));
            doubleVector3 start = (rotation * referenceLineStart) + TransmissionCentre;
            doubleVector3 stop = (rotation * referenceLineStop) + TransmissionCentre;
            doubleVector3 focus = (rotation * referenceLineFocus) +
TransmissionCentre;
            // Project lines onto imaging cone (if conical probe)
            if (m_probe.m_coneAngle > 0) {
                start.z = sqrt((pow(start.x, 2) + pow(start.y, 2)) / pow(a, 2));
                stop.z = sqrt((pow(stop.x, 2) + pow(stop.y, 2)) / pow(a, 2));
                        focus = start + normalize(stop − start) *
referenceLineFocusProjected;
                        stop = start + normalize(stop − start) *
referenceLineLengthProjected;
            }
            const double lineLength = distance(stop, start);
            line.m_start = start;
            line.m_stop = stop;
            line.m_txFocus = focus;
        }
    }
    void ImagingController::findActiveElements( ) {
        const auto& elementNormals = m_probe.m_elementNormals;
        const auto& elementPositions = m_probe.m_elementPositions;
        const uint32_t numElements =
checked_cast<uint32_t>(elementPositions.size( ));
        static std::vector<uint32_t> s_possibleElements;
        static std::vector<uint32_t> s_elementIndices;
        // Direction of line
        const doubleVector3 lineDir = normalize(lineStop − lineStart);
        const double lineLength = distance(lineStop, lineStart);
        // Find all the normal projections
        for (uint32_t i = 0; i < numElements; i++) {
            const doubleVector3& n = elementNormals[i];
            const double dotProduct = dot(n, lineDir);
            PossibleElement element;
            const doubleVector3& p = elementPositions[i];
            const doubleVector3 p0 = p − lineStart;
            const doubleVector3 p1 = p − lineStop;
            const doubleVector3 crossProd = cross(p0, p1);
            element.distance = length(crossProd) / lineLength;
            element.normalMag = dotProduct;
            element.elementNo = i;
            s_possibleElements.push_back(element);
        }
        // Sort based on distance on line, ascending order
        std::sort(s_possibleElements.begin( ), s_possibleElements.end( ));
        uint32_t maxIndices = apertureSize;
        for (uint32_t i = 0; i < s_possibleElements.size( ) && i <
size_t(maxIndices); i++) {
            s_elementIndices.push_back(s_possibleElements[i].elementNo);
        }
    }
    void ImagingController::calculateTxDelays( ) {
        for (auto& line : m_lineSequence) {
            // Generate the Tx beamforming delay profile for aperture
            for (uint32_t elementIndex = 0; elementIndex < activeElements;
elementIndex++) {
                const doubleVector3& element =
line.m_txActiveElementPositions[elementIndex];
                line.m_txDelays[elementIndex] =
calcBeamformingDelay(element, line.m_txReferencePoint, line.m_txFocus);
            }
        }
    }
    void ImagingController::calculateRxDelays( ) {
        for (auto& line : m_lineSequence) {
            // Generate the Rx beamforming delay profile for each element in
aperture
            double lineLength = length(line.m_stop − line.m_start);
            for (uint32_t elementIndex = 0; elementIndex < activeElements;
elementIndex++) {
                const doubleVector3& element =
line.m_rxActiveElementPositions[elementIndex];
                uint32_t focalIndex = 0;
                for (doubleVector3 focalDistance = 0; focalDistance < lineLength;
```

```
                                        -continued focal Distance += focalStep) {
                                        doubleVector3 focalPoint = focalDistance *
normalize(line.m__stop – line.m__start) + line.m__start;
                                        line.m__rxDelays[elementIndex][focalIndex] =
calcBeamformingDelay(element, line.m__rxReferencePoint, focalPoint);
                                        focalIndex++;
                                }
                        }
                }
        }
                doubleVector3 ImagingController::calcBeamformingDelay(const
doubleVector3& element, const doubleVector3& referencePoint, const doubleVector3&
focalPoint) {
                        const doubleVector3 FmR = focalPoint - referencePoint;
                        return (length(FmR) – distance(focalPoint, element)) * normalize(FmR) /
SPEED__OF__SOUND;
                }
```

The invention claimed is:

1. A method of operating an imaging device having an array of acoustic transducer elements distributed radially around the imaging device, the method comprising:
   deploying and moving the imaging device through a well or pipe;
   capturing a plurality scan lines, each scan line generated by a plurality of the transducer elements;
   determining an eccentricity of the device in the well or pipe from time-of-flight of at least some of the scan lines; and
   using the determined eccentricity, calculating phase delays for the transducer elements; and
   capturing at least one additional scan line by controlling the transducer elements based at least in part on the calculated phase delays to correct for the eccentricity.

2. The method of claim 1, wherein the phase delays are calculated to direct a wavefront used to capture the at least one additional scan line to arrive substantially perpendicular to a surface of the well or pipe, in a transverse plane of the well or pipe.

3. The method of claim 1, wherein the phase delays are calculated to correct the focus of the at least one additional scan line with respect to the well or pipe.

4. The method of claim 1, wherein determining eccentricity comprises creating a geometric model of the well or pipe relative to the device.

5. The method of claim 1, wherein determining eccentricity comprises fitting a circle, ellipse or spline model from the acoustic images.

6. The method of claim 1, further comprising writing the calculated phase delays into a first memory while reading other phase delays from a second memory for capturing the plurality of scan lines.

7. The method of claim 6, further comprising switching pointers to the first and second memories at a subsequent frame for the steps of writing the calculated phase delays and reading of the other phase delays.

8. The method of claim 1, further comprising, for each scan line, selecting a subset of the acoustic imaging elements that are proximate a location on the array intercepted by that scan line.

9. The method of claim 1, further comprising repeating the steps of capturing, determining eccentricity and calculating phase delays, in real-time, while moving the device through the well or pipe.

10. The method of claim 1, wherein determining eccentricity is performed over a plurality of frames, or performed over a moving average, median fit or spline fit of a plurality of recent frames.

11. The method of claim 1, wherein eccentricity is calculated to model localized portions of the well or pipe that are deformed and wherein the capturing at least one additional scan line includes beamforming for the localized portions based on the model.

12. The method of claim 5, wherein the capturing at least one additional scan line includes synthesizing the at least one scan line as appearing to originate from a centre of the model of the well or pipe.

13. The method of claim 1, further comprising adjusting start of a receiving window for each of the plurality of scan lines based on an eccentric distance from the plurality of the transducer elements in that scan line to the well or pipe.

14. A device comprising:
   an elongate body deployable into a well or pipe;
   an array of acoustic transducer elements connected to and distributed radially with respect to the elongate body;
   a memory storing phase delays for beamforming scan lines from a plurality of transducer elements;
   a circuit to transmit and capture the scan lines using the phase delays; and
   a processor arranged to:
      calculate eccentricity of the device in the well or pipe from time-of-flight of at least some of the scan lines;
      using the calculated eccentricity of the device, calculate new phase delays for the transducer elements; and
      load the new phase delays into the memory;
   wherein the circuit is configured to control the transducer elements based at least in part on the new phase delays to capture at least one additional scan line to correct for the eccentricity.

15. The device of claim 14, further comprising a multiplexer for selecting a set of transducer elements from the array to create the at least one additional scan line and wherein the processor is arranged to select the set elements for each scan line to correct for the eccentricity.

16. The device of claim 14, wherein the memory is logically or physically divisible into a first memory portion accessed by the circuit for beamforming and a second memory portion accessed by the processor for writing the new phase delays, wherein the circuit or processor is arranged to switch pointers to the first and second memory portions for writing and reading of the phase delays.

17. The device of claim 14, wherein the new phase delays are calculated to direct a wavefront used to capture the at least one additional scan line to arrive substantially perpendicular to a surface of the well or pipe, in a transverse plane of the well or pipe.

18. The device of claim 14, wherein the new phase delays are calculated to correct the focus of the at least one additional scan line with respect to the well or pipe.

19. The device of claim 14, wherein calculating eccentricity comprises creating a geometric model of the well or pipe relative to the device, the geometric model comprising a circle, ellipse or spline model from the acoustic images.

20. The device of claim 14, wherein the processor is further arranged to select, for each scan line, transducer elements that are proximate a location on the array intercepted by that scan line.

21. The device of claim 14, wherein the processor is further arranged to repeat the steps of calculating eccentricity and calculating new phase delays, in real-time, while the device moves through the well or pipe.

22. The device of claim 14, wherein calculating eccentricity is performed over a plurality of frames, or performed over a moving average, median fit or spline fit of a plurality of recent frames.

23. The device of claim 14, the processor is further arranged to adjust start of a receiving window, for each at least one additional scan line, based on an eccentric distance from the plurality of the transducer elements in the respective at least one additional scan line to the well or pipe.

* * * * *